United States Patent Office 3,489,820
Patented Jan. 13, 1970

3,489,820
ELASTIC FIBERS FROM EMULSION POLYMERS
Walter A. Henson and Robert E. Erickson, Midland, Mich., assignors to The Dow Chemical Company, Midland, Mich., a corporation of Delaware
No Drawing. Filed Mar. 24, 1967, Ser. No. 625,624
Int. Cl. C08f 41/10
U.S. Cl. 260—834          15 Claims

ABSTRACT OF THE DISCLOSURE

Elastic fibers are prepared by mixing an emulsion copolymer containing reactive carboxylic acid and/or hydroxyl groups with a coreactive polyfunctional material, spinning the fibers into an acidic coagulating bath, washing and heating the fiber to complete the coagulation reaction. Coreactive materials used include urea, melamine, aldehyde condensation products of urea or melamine, alkylated aldehyde condensation products of urea or melamine and polyepoxides.

---

This invention relates to a method for producing elastic fibers and like shaped articles from a mixture of an emulsion copolymer which contains certain reactive groups with a polyfunctional coreactive material, and to the fiber or shaped article produced by such method.

Synthetic fibers are frequently prepared from solutions of polymers in organic solvents using various spinning and coagulation processes. An elastic fiber can be prepared from a polyurethane solution by air spinning techniques, for example. The use of organic solvents, however, poses a number of problems such as solvent cost, the expense and difficulty of solvent removal and recovery and frequently there can be an explosive or toxic hazard involved.

To obviate the organic solvent problem, attempts have been made to use water as the solvent. Some polymers are soluble in certain concentrated salt solutions, but there is difficulty with the poor solubility of high molecular weight polymers. This difficulty can be overcome by the use of aqueous dispersions where a high solids content can be achieved with high molecular weight polymers, but this appears to be useful only for non-elastic fibers.

It has been proposed in U.S. Letters Patent 2,955,907 to prepare an elastic fiber from emulsion polymers containing reactive groups by spinning the emulsion into a coagulating bath which contains a polyfunctional reactant. However, such a process allows little latitude with any one combination of materials since the formation of the fiber is then dependent on a variable concentration of the polyfunctional reactant, surface reactions, diffusion characteristics of large molecules, non-homogeneous cross-linking, and the like.

Accordingly, it is an object of this invention to provide a process for the preparation of an elastic fiber and like shaped articles from an emulsion copolymer which contains certain reactive groups by the incorporation of a coreactive polyfunctional material into the emulsion copolymer before it is exposed to coagulation conditions. Another object is to provide a process wherein the properties of the fiber or the shaped article may be uniformly varied by appropriate selection of the proportions of the emulsion polymer and the coreactive polyfunctional material. A further object is to provide a relatively strong, cohesive, self-supporting elastic fiber.

These and other objects which are evident from the following description are accomplished by mixing an emulsion polymer containing reactive carboxylic acid or hydroxyl groups or mixtures thereof with a coreactive polyfunctional material, passing the mixture through an orifice or jet or spinneret into and through an acidic coagulating bath to form a fiber or a shaped article, washing the fiber or article, heating to complete the coagulation and reaction and collecting the fiber or shaped article.

An important chemical characteristic of the copolymers which can be utilized as latexes of the present invention is the presence of a carboxylic acid group, a hydroxyl group or mixtures thereof. To prepare the latexes applicable to the practice of this invention, a mixture of monomers of the class of styrene and monomers copolymerizable with styrene is utilized.

The mixture of monomers which is copolymerized to form a latex is comprised of about 30 to about 45 percent by weight of an alkenyl aromatic monomer, about 0.5 to 5 percent by weight of one or more monomers containing a carboxylic acid group or a hydroxyl group and the balance, to make 100 percent, of a conjugated olefinic monomer. Suitable conjugated olefinic monomers include 1,3-butadiene, isoprene, chloroprene and the like, with 1,3-butadiene preferred. Alkenyl aromatic monomers include styrene, α-methyl styrene, vinyl toluene, the various halostyrenes and the various alkyl-substituted styrenes such as t-butyl styrene and the like, with styrene and α-methyl styrene preferred.

Polymerizable monomers which contain a hydroxyl or carboxylic acid group include ethylenically unsaturated carboxylic acids, hydroxyalkyl esters of ethylenically unsaturated carboxylic acids and N-hydroxyalkyl acrylamides. The carboxylic acid monomers include monocarboxylic acids such as acrylic, methacrylic, crotonic acids, and the like; dicarboxylic acids such as maleic, fumaric, itaconic acids, and the like; monoesters of dicarboxylic acids such as the half esters of maleic, fumaric and itaconic acids and mixtures of any of the above. The hydroxyl containing monomers include hydroxyethyl acrylate or methacrylate, hydroxypropyl acrylate or methacrylate, hydroxybutyl acrylate or methacrylate and the like; and N-methylol acrylamide, N-hydroxyethyl acrylamide, N-hydroxypropyl acrylamide and the like. Preferred monomers include acrylic, methacrylic, itaconic, fumaric and maleic acids and hydroxyethyl and hydroxypropyl acrylates or methacrylates.

In the practice of this invention preferred latexes include those prepared by polymerizing a monomer mixture comprising styrene as the alkenyl aromatic monomer; 1,3-butadiene as the conjugated olefinic monomer; and one or more α,β-unsaturated carboxylic acid monomers, hydroxyalkyl acrylate or methacrylate monomers.

Such monomers are copolymerized in an aqueous emulsion containing surface active agents, catalysts, modifiers, etc. and under conditions of time; temperature, pressure, agitation, etc., in accordance with well known principles of emulsion polymerization, so long as the choice of constituents employed in the polymerization are compatible with the polymerizable monomers. The emulsion usually contains about 40 to 70 percent by weight of polymer. The latexes may be prepared by copolymerization of monomers selected as hereinbefore described or there may be substituted for such latexes water dispersions of preformed polymers which have been modified, e.g. by grafting hydrolysis or other means, to have pendant carboxylic acid or hydroxyl groups. Since this invention is related to the utilization of the latex, however prepared, recitation of polymerization art familiar to skilled workers need not be discussed at length herein.

The coreactive polyfunctional materials which are mixed with the latexes are those materials which are soluble in water or in water-miscible solvents or which are water-dispersible and which have at least two groups which are coreactive with the carboxylic acid or hydroxyl groups of the copolymer of the latex.

Suitable coreactive materials include aldehyde condensation products of ammonia, urea, ethyleneurea, phenolic compounds, melamine and the like; alcohol-modified aldehyde condensation products of urea, ethyleneurea and melamine and the like wherein the alcohol contains from 1 to 4 carbon atoms; urea; ethyleneurea; melamine; liquid epoxy resins which contain more than one oxirane group per molecule; and the like. The alcohol-modified aldehyde condensation products, above, include both partially alkylated products as well as completely alkylated products.

An important feature of this invention relates to the uniformity of product and to the range of properties which can be obtained. This is accomplished by mixing the latex with the coreactive material before formation of a coagulate. By this process the coreactive material can be thoroughly and uniformly admixed with the latex and additionally a wide range of compositions can be obtained by varying the type of coreactive material utilized and also by varying the proportions of the coreactive material to the latex copolymer. The latex and coreactive material are used in such amounts that the mixture contains the coreactive material in an amount equal to about 1 to about 100 percent of the weight of the copolymer comprising the latex, and preferably from about 3 to about 20 percent.

The above mixture is then exposed to coagulating conditions by extrusion or spinning of the mixture into a coagulating bath. The device for spinning or extrusion may have a single orifice or it may have multiple openings. The device, itself, may be constructed from a wide range of materials. The orifice or openings may have a number of different configurations, such as circular, elliptical, slotted, and the like. The mixture is conveniently fed to the device by a constant pressure or a constant displacement method.

The device for extrusion or spinning of the mixture is in direct contact with the coagulation bath, so as the mixture leaves the orifice or openings it continuously forms a coagulate whose cross-section conforms to that of the orifice or opening. The coagulation bath comprises an aqueous solution of electrolyte, the bath having a pH of about 5 or less. Preferably the aqueous coagulation bath has a pH of about 1 to 3 or less. Water soluble organic and inorganic acids may be used to prepare the coagulation bath. Such suitable acids include hydrochloric acid, sulfuric acid, phosphoric acid, acetic acid, oxalic acid, citric acid, the organic sulfonic acids and the like. A wide range of solution concentrations can be utilized, even glacial acetic acid; preferably concentrations of acidic electrolytes may range up to 10 to 20 percent by weight. Among the preferred coagulants are aqueous solutions containing up to 5 percent by weight of hydrochloric acid.

In addition to acidic electrolytes the coagulation bath may also contain various water soluble salts such as the chlorides of sodium, potassium, lithium, calcium, magnesium, zinc and the like as well as other water soluble acetate, sulfate, phosphate, oxalate, etc. salts of similar metals. Such salts may be used in concentrations up to 40 to 50 percent by weight depending on solubility. While room temperatures or lower can be used it is generally preferred that the coagulation bath be heated, for example, to temperatures in the range of 30 to 90° C., since less time will be required to form a coherent coagulate. Heat is particularly desired when a continuous process is employed or when it is desired to achieve coagulation with a minimum of time.

After coagulation the fiber or shaped article may be washed with water to remove the electrolytes. The wash water is usually kept at a temperature of 20 to 80° C. The washed product is dried and heated to complete the curing reaction between the coreactive material and latex copolymer. While temperatures for curing may range from about 90 to about 175° C. or higher, it is preferred to cure the product at about 150 to 165° C. for periods of time about one to ten minutes. Generally at the higher temperatures and the cure time is greatly reduced, for example, the curing time at about 165° C. is about one minute. This, of course, is a practical advantage for continuous production.

The following examples illustrate how this invention may be practiced but the invention is not limited thereto. Unless otherwise stated all parts and percentages are by weight.

EXAMPLE 1

The ability of various coreactive materials to react with a latex of this invention was first evaluated by determining the pH at which gelation occurs. This ability to coreact and form a gel relates to this invention in at least two aspects, i.e. it defines a pH level above which the mixture should be kept before coagulation and it also defines those materials which will react with the latex at a lower pH to form a more coherent, particulate coagulate.

The tests for coreaction were made with a latex comprising a copolymer of 40 percent styrene, 58 percent 1,3-butadient, 1.75 percent acrylic acid and 0.25 percent fumaric acid. The pH of the latex was adjusted to 8.5 to 9.0 with ammonium hydroxide. To the latex was then added 5 parts of a coreactive material per 100 parts of the copolymer in the latex and the pH was slowly and continuously reduced until gelation occurred. The pH was adjusted either by the addition of sodium silico-fluoride to the mixture or by the addition of dilute acetic acid. Similar results are found using either procedure. The following materials were found to gel the above latex and the pH at which gelation occurs is recorded below.

|  | pH |
| --- | --- |
| Urea | 4.8 |
| Melamine | 6.5 |
| Melamine-formaldehyde resin | 6.6 |
| Urea-formaldehyde resin | 5.8 |
| Partially methylated melamine formaldehyde resin | 6.0 |
| Hexamethoxy methylol melamine | 5.8 |
| Emulsion of a low molecular weight epoxy resin based on bisphenol A | 5.8 |

EXAMPLE 2

A latex similar to that of Example 1 was used to prepare fibers according to the process of this invention. A mixture was prepared comprising 100 parts latex (dry weight basis), 5 parts trimethoxymethyl melamine, 2.5 parts trimethylol melamine and 0.25 part of a methyl, hydroxypropyl cellulose ether.

This mixture was then extruded through a glass capillary spinneret into a coagulating bath comprising glacial acetic acid. The fibers produced were washed for 10 to 15 minutes and cured for 45 to 60 seconds at 165° C. The fibers had an average diameter of 0.025 inch and were evaluated and tested for the following physical properties:

| Sample No.: | Modulus of elasticity (p.s.i.) | Percent [1] elongation |
| --- | --- | --- |
| 1 | 60.6 | 487.5 |
| 2 | 60.0 | 418.7 |
| 3 | 56.5 | 437.5 |
| 4 | 74.7 | 506.2 |
| 5 | 58.8 | 312.5 |
| 6 | 60.0 | 437.5 |
| Av. value | 61.8 | 433.3 |

[1] To breaking point.

The above properties were obtained on an Instron Tensile Testing Instrument, Model TTB with the following machine conditions: chart speed 2 in./min., crosshead speed 2 in./min., Cell B, full scale setting equals 100 g. and 1 in. gauge length.

Yield loads were also determined and the average tenacity was calculated to be 0.029 gm./denier.

| Sample No.: | Yield load (gms.) |
|---|---|
| 1 | 137.9 |
| 2 | 49.2 |
| 3 | 50.5 |
| 4 | 122.0 |
| 5 | 84.0 |
| 6 | 63.0 |
| Av. value | 84.4 |

Additionally the fibers were evaluated for elastic recovery at various percent elongations. The Instron machine conditions were: chart speed 5 in./min., crosshead speed 5 in./min., Cell B, 1 in. gauge length and full scale setting equals 100 g. The procedure for measuring recovery was as follows: The fiber was elongated to the desired elongation at 5 in./min. and when this point was reached the machine was reversed and the grips returned at 5 in./min. to the original jaw separation. After a 5 minute interval the sequence was repeated. The immediate elastic recovery is determined (ref. Backer et al., "Tensile Recovery Behavior of Textile Fibers," Textile Research Journal XXI, No. 7, pp. 482–509, 1951), and the difference between the total elongation and the immediate elastic recovery is recorded as the delayed elastic recovery. The results are shown below.

| Percent total elongation | Percent immediate elastic recovery | Percent delayed elastic recovery |
|---|---|---|
| 350 | 137 | 213 |
| 300 | 166 | 134 |
| 250 | 127 | 123 |
| 150 | 109 | 41 |
| 125 | 100 | 25 |
| 100 | 96 | 4 |
| 50 | 46 | 4 |

EXAMPLE 3

As shown in Example 2 the coagulation bath may be glacial acetic acid. Coagulation studies showed that an acidic coagulation bath was necessary to get proper formation of a fiber. While weakly acidic organic acids are effective the stronger acids such as 1 percent aqueous solutions of hydrochloric acid actually coagulate the mixture of the latex and the coreactive material more rapidly. Solutions of salts are not effective coagulants unless an acidic electrolyte is also added, for example, a 2 percent solution in water of potassium oxalate was not effective in forming a fiber.

EXAMPLE 4

Similar results to those of Example 2 are obtained by replacing the carboxylic acids of the copolymer with 2-hydroxyethyl acrylate, 2-hydroxyethyl methacrylate, 2-hydroxypropyl acrylates or 2-hydroxypropyl methacrylate.

The mixtures of latexes and coreactive materials of the present invention may have added thereto other materials commonly used in the preparation of fibers and shaped articles. Such materials include fillers, plasticizers, rosins, stabilizers, dyestuffs, pigments, thickening agents, solvents and the like.

Considerable variation is possible within the scope of the present invention. In addition to fibers it would also be possible to prepare ribbons, tapes and hoses or tubing and the like as well as to impregnate other natural or synthetic fibers with the latex-coreactive material mixture before coagulation. Additionally the mixture may be coagulated around a central core material such as a fiber. Other modifications would include producing the coagulate as a film or sheet or as an adherent coating to a substrate or web.

The elastic fibers prepared according to this invention are useful in preparing many different types of fabrics wherein the elastic properties are advantageously utilized in a variety of garments and the like. Such fabrics may be woven from a large number of available fibers in combination with the elastic fibers of this invention or may be woven entirely from the elastic fiber. The end use of the fabric will best determine its composition.

What is claimed is:
1. A process for preparing elastic articles which comprises:
(A) mixing
(1) an emulsion copolymer comprising from about 0.5 to about 5 percent by weight of at least one monomer selected from the group consisting of ethylenically unsaturated carboxylic acids and hydroxyalkyl esters of ethylenically unsaturated monocarboxylic acids; from about 30 to about 45 percent by weight of at least one alkenyl aromatic monomer; and the balance to make 100 percent of at least one conjugated olefinic monomer; with
(2) from about 1 to about 100 percent by weight on the weight of the copolymer of at least one coreactive material having more than one reactive group wherein the coreactive material is selected from the group consisting of aldehyde condensation products of urea and melamine; alcohol-modified aldehyde condensation products of urea and melamine where the alcohol contains from 1 to 4 carbon atoms; melamine, urea; and liquid epoxy resins containing more than one oxirane group per molecule,
(B) interacting and forming the components of said mixture into an article by passing the mixture through an orifice into a coagulating bath having a pH below about pH 5,
(C) drawing the article through and out of the coagulating bath,
(D) washing the article, and
(E) heating to cure the article.
2. The process of claim 1 wherein the orifice is a spinneret resulting in the formation of filaments.
3. The process of claim 1 wherein the ethylenically unsaturated carboxylic acid is acrylic, methacrylic, fumaric, itaconic or maleic acid.
4. The process of claim 1 wherein the hydroxyalkyl ester is an ester of acrylic or methacrylic acid.
5. The process of claim 1 wherein the coreactive material is a melamine resin.
6. The process of claim 1 wherein the emulsion copolymer comprises a copolymer of styrene, 1,3-butadiene, acrylic acid and fumaric acid.
7. The process of claim 1 wherein the emulsion copolymer is a copolymer of 1,3-butadiene, styrene and a hydroxyalkyl acrylate or methacrylate.
8. The elastic article produced by the process of claim 1.
9. A process for preparing elastic articles which comprises:
(A) mixing
(1) an emulsion copolymer comprising from about 0.5 to about 5 percent by weight of at least one monomer selected from the group consisting of ethylenically unsaturated carboxylic acids and hydroxyalkyl esters of monocarboxylic acids; from about 30 to about 45 percent by weight styrene; and the balance to make 100 percent of 1,3-butadiene; with
(2) from about 1 to about 100 percent by weight on the weight of the copolymer of at least one coreactive material having more than one reactive group wherein the coreactive material is selected from the group consisting of aldehyde condensation products of urea and melamine, and alcohol-modified aldehyde condensation products of urea and melamine where the alcohol contains from 1 to 4 carbon atoms, (B) interacting and forming the components of said mixture into an article by passing the mixture through an orifice into acoagulating bath having a pH below about pH 5, (C) drawing the article through and out of the coagulating bath, (D) washing the article, and (E) heating to cure the article.

10. The process of claim 9 wherein the orifice is a spinneret resulting in the formation of filaments.

11. The process of claim 9 wherein the ethylenically unsaturated carboxylic acid is acrylic, methacrylic, fumaric, itaconic, or maleic acid.

12. The process of claim 9 wherein the hydroxyalkyl ester is an ester of acrylic or methacrylic acid.

13. The process of claim 9 wherein the coreactive material is a melamine resin.

14. The process of claim 9 wherein the emulsion copolymer is a copolymer of 1,3-butadiene, styrene, acrylic acid and fumaric acid.

15. The elastic article produced by the process of claim 9.

References Cited

UNITED STATES PATENTS

| 2,376,511 | 5/1945 | Saunders et al. | |
| 2,914,376 | 11/1959 | Bibolet et al. | 264—184 X |
| 2,955,017 | 10/1960 | Boyer | 264—184 X |
| 2,963,340 | 12/1960 | Satterthwaite. | |
| 3,055,729 | 9/1962 | Richter | 264—184 |
| 3,144,426 | 8/1964 | Burke et al. | 260—852 X |
| 3,215,647 | 11/1965 | Dunn | 260—852 X |
| 3,233,026 | 2/1966 | Richter. | |
| 3,256,234 | 6/1966 | Miller et al. | |
| 3,345,206 | 10/1967 | Korpman | 260—852 X |

FOREIGN PATENTS 915,031　1/1963　Great Britain.

JULIUS FROME, Primary Examiner

J. H. WOO, Assistant Examiner

U.S. Cl. X.R.

260—2, 29.4, 29.7, 836, 837, 852, 856; 264—183, 184, 210, 236, 347